Patented Oct. 9, 1934

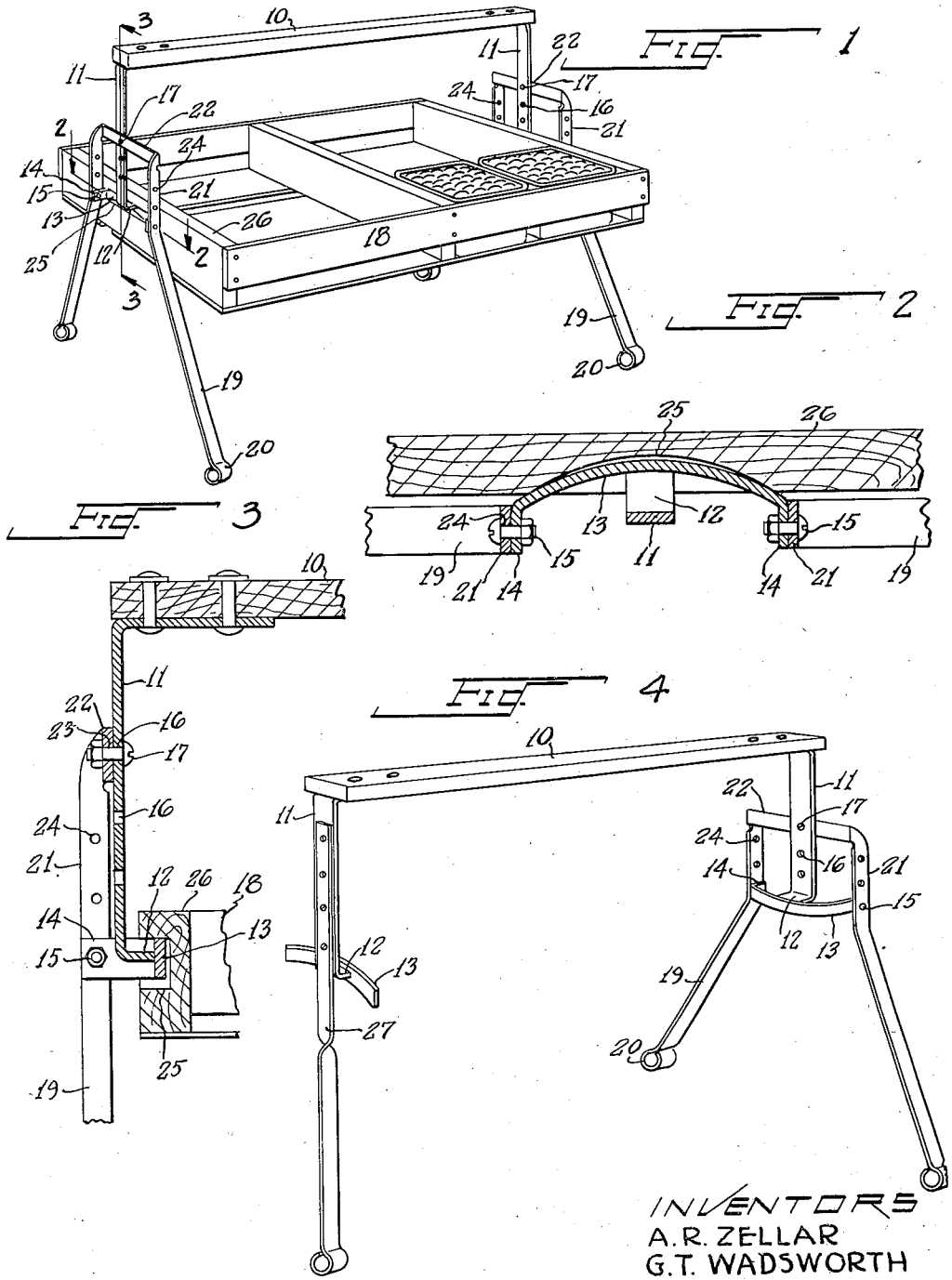

1,976,206

UNITED STATES PATENT OFFICE 1,976,206

CRATE CARRIER

Archie R. Zellar, Woodburn, and George T. Wadsworth, Gervais, Oreg.

Application August 22, 1931, Serial No. 558,722

4 Claims. (Cl. 224—48)

This invention relates generally to the berry picking art, and particularly to a crate carrier used by berry pickers when gathering the berries.

The main object of this invention is to provide an exceedingly simple and efficient form of crate carrier which will be simple and sturdy in construction, light in weight and capable of adjustments for height.

The second object is to provide a light weight carrier providing the maximum amount of rigidity against horizontal movement of the crate.

The third object is to construct a carrier which is easily convertible from the simple handle type of carrier to the raised type in which the tray is held at a distance above the ground and in which the tray elevating means normally remains with the handle during a certain class of picking, or may be separated therefrom permitting the tray to rest upon the surface of the ground as when picking strawberries, for example.

These, and other objects, will become more apparent from the specification following as illustrated in the accompanying drawing, in which:

Fig. 1 is a perspective view of the completed carrier showing same supporting a crate.

Fig. 2 is a section taken along the line 2—2 in Fig. 1.

Fig. 3 is a section taken along the line 3—3 in Fig. 1.

Fig. 4 is a perspective view of a modified form of the device providing a tripod effect.

Similar numbers of reference refer to similar parts throughout the several views.

Before entering into a description of this device attention is called to a copending application by Archie R. Zellar, Number 548,885, over which this is an improvement.

Referring in detail to the drawing, the device consists of a horizontal handle member 10 having the downwardly extending arms 11 secured to each end thereof. Each arm 11 has an inturned portion 12 to which is secured an arcuate claw 13 whose ends 14 are turned parallel with each other and perforated to receive the bolts 15. The arms 11 are provided with a series of holes 16 adapted to receive a bolt 17.

The portion of the device thus far described constitutes the handle by means of which an ordinary picking crate 18 may be handled when picking low growing fruit, and is quite similar to the one illustrated in the above-identified application.

Referring particularly to the means for supporting the trays in an elevated position same will be seen to consist of a pair of inclined legs 19 preferably curled at their feet 20 to prevent them from catching on objects or digging into the ground, and having their upper portions 21 vertical or parallel with each other and spaced from each other far enough to receive the ends 14 between same. The portions 21 are united at their upper ends by the cross bar 22 provided with a central opening 23 for the reception of the bolt 17. The portions 21 are also provided with a series of holes 24 adapted to receive the bolts 15. The holes 24 are spaced equally with the holes 16 permitting an easy adjustment of the spacing between the top of the claw 13 and the ground. Each claw 13, it will be understood, engages the arcuate slot 25 formed in each end 26 of the crate 18.

In the form of the device shown in Fig. 4, the construction is identical with that shown in Fig. 1, except that the leg 27 is vertical and is bolted against the flat side of one of the arms 11, and the lower portion of the leg 27 is twisted into the vertical plane of the handle 10. This form of the device, while somewhat lighter than the form shown in Fig. 1, more readily adapts itself to uneven ground and interferes less with the movements of the feet of the carrier.

We claim:

1. A crate carrier having in combination a horizontal handle member, a downwardly extending crate-engaging claw at each end thereof, and leg members adjustably attached to each of said claw members, said claws being yieldable with relation to each other.

2. In a crate carrier, the combination of a horizontal handle member having a downwardly extending arm at each end thereof, each of said arms terminating in an arcuate claw adapted to engage the handle slot of a crate, and a pair of leg members at each end of said carrier having their upper ends joined to said downwardly extending arm and intermediate portions joined to said claw.

3. In a crate carrier, the combination of a horizontal handle member having a downwardly extending arm at each end thereof, each of said arms terminating in an arcuate claw adapted to engage the handle slot of a crate, a pair of adjustable leg members at each end of said carrier having their upper ends joined to said downwardly extending arms and intermediate portions joined to said claw.

4. In a crate carrier, the combination of a horizontal handle member having a downwardly extending spring arm at each end thereof, each of said arms terminating in a transversely extending arcuate claw adapted to engage the handle slot of a crate.

ARCHIE R. ZELLAR.
GEORGE T. WADSWORTH.